United States Patent
Diddams et al.

[15] 3,686,322
[45] Aug. 22, 1972

[54] PROCESS FOR PURIFYING VANILLIN

[72] Inventors: Donald Guy Diddams, Schofield; Norman Ernest Renaud, Rothschild, both of Wis.

[73] Assignee: Sterling Drug, Inc., New York, N.Y.

[22] Filed: Dec. 10, 1970

[21] Appl. No.: 96,974

Related U.S. Application Data

[63] Continuation of Ser. No. 780,592, Dec. 2, 1968, abandoned.

[52] U.S. Cl. ................................................. 260/600
[51] Int. Cl. ........................................... C07c 45/24
[58] Field of Search .................................... 260/600

[56] References Cited

UNITED STATES PATENTS

| | | |
|---|---|---|
| 2,745,796 | 5/1956 | Toppel .................. 260/600 X |
| 3,049,566 | 8/1962 | Schoeffel .................. 260/600 |
| 2,506,540 | 5/1950 | Bryan .................. 260/600 X |
| 2,489,200 | 11/1949 | Sankey et al. ............ 260/600 |

OTHER PUBLICATIONS

Weissberger, Part I Separation & Purification (1956) 149– 152, 301– 307

Primary Examiner—Bernard Helfin
Attorney—R. P. Auber

[57] ABSTRACT

Crude vanillin in aqueous mixture with structurally related compounds, particularly vanillin from the mother liquors obtained in purification of vanillin derived from the oxidation of lignin liquor, is purified by partial extraction with hot hydrocarbon solvent, cooling to crystallize vanillin therefrom and repeating the procedure, preferably re-using the same portion of solvent, to extract succeeding portions of vanillin.

6 Claims, No Drawings

PROCESS FOR PURIFYING VANILLIN

This application is a continuation of application Ser. No. 780,592 filed Dec. 2, 1968 and now abandoned.

This invention relates to a process for purifying crude vanillin, more particularly to the recovery of vanillin from the mother liquors obtained in the purification of vanillin derived from the oxidation of lignin liquor.

BACKGROUND OF INVENTION

The manufacture of vanillin from lignin by oxidation, e.g., as described in U.S. Pat. No. 2,434,626, results in the formation of other products in addition to vanillin. Purification of this vanillin may be accomplished by crystallization using methanol-water solvent mixtures, e.g., as described in U.S. Pat. No. 3,049,566. The mother liquors resulting from these crystallizations of vanillin contain substantial amounts of vanillin mixed with other compounds, e.g., acetovanillone, 5-formylvanillin, and p-hydroxybenzaldehyde. These compounds are difficult to separate from vanillin.

Vanillin purification processes, for example, as described in U.S. Pat. No. 3,049,566, employ vanillin of 85 to 90 percent purity as a starting material. Thus, if the vanillin in the mother liquors can be raised to this concentration, further purification can be achieved by known methods.

Various methods have been employed in an attempt to recover the vanillin in the mother liquors, e.g., repeated recrystallization from methanol-water, distillation and fractional precipitation of phenolate salts. None were successful, either because the resulting material contained more than 15 percent impurities or the method was too laborious and costly to be economically feasible.

Distillation of the solvent from the mother liquor produces two phases, one of which is an oily phase made up of the aforesaid mixture of compounds and some water, and the other is a water phase also containing vanillin and one or more of the other compounds. A typical oily phase contains about 65 percent vanillin, 10 percent p-hydroxybenzaldehyde, 2 percent 5-formylvanillin and 23 percent water. A typical water phase contains about 2.7 percent vanillin, 0.64 percent p-hydroxybenzaldehyde and about 0.1 percent 5-formylvanillin. However, although the mother liquor contains a considerable amount of vanillin, vanillin is not recoverable therefrom by conventional means. Vanillin will not crystallize out of either phase. Methanol extraction was not considered useful to selectively extract vanillin from the mother liquor mixtures because of its poor purification capabilities. Fractional distillation under vacuum gave unsatisfactory separations.

DESCRIPTION OF INVENTION

It has now been found that saturated hydrocarbons will selectively extract vanillin from aqueous crude mixtures with structurally similar compounds and purified vanillin can be isolated therefrom.

At temperatures above 30° C. saturated hydrocarbons will extract vanillin from aqueous mixtures with 5-formylvanillin, p-hydroxybenzaldehyde and acetovanillone and purified vanillin recovered from the extracting solvent by cooling below 30° C., which results in precipitation of purified vanillin which ordinarily is more than 85 percent pure.

The material from which the vanillin is extracted can be any aqueous mixture of vanillin with any or all of the aforesaid compounds, e.g., the residue remaining after distillation of the methanol crystallization of lignin vanillin from methanol-water. This latter material separates into two phases, one of which is an oily phase which contains a minor amount of water, e.g., 15–30 percent, and a water phase, a major portion of which is water, e.g., 90–98 percent. Vanillin is present in both and either can be used in the process of this invention. If desired, sufficient water can be added to form a single phase but because of the solubility of vanillin in water, more solvent and/or larger equipment will be required to achieve the same recovery of vanillin. However, the selectivity of the hydrocarbon solvent for the vanillin is greater in the presence of more water. Therefore, a higher yield of high purity vanillin can be achieved by doing so. Alternatively, the initial extraction or extractions can be conducted on the oily phase and thereafter, as the ratio of vanillin to impurities in the residue drops, or the purity of the extracted vanillin approaches the acceptable lower limit of purity, water can be added until vanillin of acceptable purity is again extracted.

The vanillin-containing mixture is subjected to repeated extractions, i.e., an amount of solvent insufficient to extract all the vanillin is employed in each extraction. Usually the first extraction will yield vanillin of greater than 90 percent purity. With each successive extraction, the compounds other than vanillin build up in the mixture and the vanillin obtained is less pure, unless fresh solvent is employed. However, even after repeated extractions, vanillin of over 85 percent purity is obtained.

When subjecting the mixtures to repeated passes usually the same batch of solvent is reused. After the first hot extraction and cooling cycle and the crystals are filtered off, the resulting filtrate is saturated with a small amount of vanillin. This solvent, saturated with vanillin, is recycled to the extraction step. Losses due to vanillin dissolving in the solvent are thereby limited to the saturation level of the solvent at the temperature of crystal recovery. The vanillin thus recovered can thereafter be further purified by known means, e.g., recrystallization from methanol-water in the manner described in U.S. Pat. No. 3,049,566.

In addition to providing a method for the recovery of mother-liquor vanillin, this process also makes possible the recovery of the compounds admixed with the vanillin which themselves are articles of commerce, e.g., as antioxidants for metal plating processes.

The hydrocarbon solvents which can be employed are at least predominantly saturated hydrocarbons whose boiling point is between 100° and 275° C., preferably between 125° and 200° C., and more preferably between 150° and 200°C. Because of their economy, petroleum cuts are preferably employed. These usually contain a combination of aromatics, paraffins and naphthenes. Preferably, the solvent consists of at least 50 percent of the paraffins, e.g., the $C_9$ and $C_{10}$ straight and branched chain saturated hydrocarbons. The naphthenes, e.g., cyclopentanes, cyclohexanes, can also be used alone or as a mixture with paraffins and/or petroleum aromatics boiling within the selected range. LEP Solvent (W–3) (American Mineral Spirits Company) is a hydrocarbon solvent boiling at 158°–174°C. and which has a good balance of solvent power, boiling point and cost. Other liquids, e.g., ethers, alcohols, or esters, in amounts which do not change the solvating power of the solvent, may be present.

The extraction step is carried out above 30° C., e.g., 40° to 150° C., preferably 60° to 100° C., most preferably about 70° C. Higher temperatures may be employed but the solvent becomes less selective. This is reflected in the ratio of the amounts of vanillin to p-hydroxybenzaldehyde present in the hydrocarbon layer after extraction. At 70° C., the ratio by weight of vanillin to p-hydroxybenzaldehyde is about 10 while at 100° C. it drops to 7.65. The amount of solvent used will vary with the selected solvent and the temperature to which the mixture is heated. Preferably, an amount is employed which extracts less than half of the vanillin in the mixture, preferably from 5 to 25 percent, more preferably 10–20 percent. This usually requires from 10 volumes of solvent. In a continuous process, dwell times rather than relative volumes are important and a system should be employed which balances solvent flow rate with extraction efficiency so as to obtain optimum operating efficiency with the equipment employed.

The solvent and the mixture to be extracted can be mixed with each other either before or after heating. For example, the heated solvent can be mixed with a cooled mixture, vice versa, or both may be cooled and brought to the desired temperature after mixing.

The length of time which the two phases will be in contact will be governed by the time required to dissolve an acceptable amount of vanillin. In the laboratory, this normally requires about twenty minutes using LEP (W–3). The first pass with LEP (W–3) in 20 minutes at 70° C., recovers about 8.4 grams of vanillin per 100 ml. of oil. Lesser amounts of vanillin are recovered in subsequent passes because of its decreasing concentrations in the material to be extracted. Larger scale processes may require longer contact times between the solvent and the phase to be extracted in order to achieve equilibrium conditions.

The cooling step is carried out after the solvent has been separated from the phase which has been extracted. Cooling to 20° C. has been found to be satisfactory for the precipitation of most of the vanillin dissolved in the solvent. Some vanillin remains in the solvent after filtering off the precipitated vanillin crystals. However, the solvent is reused and the small amount of dissolved vanillin at 20° C., does not have a significant effect upon subsequent extractions at 70° C. If desired, temperatures lower than 20° C. may be employed in the crystal recovery step, e.g., 0° to −10° C., but the preferred range is about 20° C.

The process involves contacting the hydrocarbon solvent with the phase to be extracted. This contact can be effected by adding the solvent to the phase which is to be extracted or vice versa. Agitation during the process is desirable because the amount of contact between the solvent and the other phase is increased thereby. Sufficient agitation can be achieved with commercially available stirrers or agitators. The process can be carried out either as a batch or as a continuous process. Countercurrent extraction is one example of an alternative method of effecting a desired degree of contact between the two phases.

After removal of the vanillin from the solvent used for extraction by cooling below 30° C., the solvent can be recycled to effect another extraction of the other phase. Numerous passes through one batch of mother liquor can be made before the resulting vanillin drops below 85 percent purity.

The method of this invention is particularly suitable for application to residues resulting from the distillation of the crystallizing solvent from residual mother liquors. The residue, which separates into a water and an oil phase, contains vanillin and p-hydroxybenzaldehyde as its main constituents. The amounts of each will vary. A typical analysis of the methanol-still residue is as follows:

TABLE I

Vanillin Mother Liquors After Solvent Removal

|  | Vol. % | Vanillin % | p-OH benzaldehyde % | 5-formyl-vanillin % | Water % |
|---|---|---|---|---|---|
| Oil Phase | 39 | 65.5 | 10.7 | 1.7 | ca. 22 |
| Water Phase | 61 | 26.6 | 6.35 | 0.72 | ca. 97 |

The following examples are illustrative of the invention, which is not limited thereto.

EXAMPLE 1

Extraction of vanillin from lignin vanillin crystallization mother liquors.

The mother liquors from the methanol-water crystallization of lignin vanillin was heated to remove volatiles and then cooled to 30° C. The residue separated into a water and an oil phase. About 100 milliliters each was separately extracted with AMSCO LEP solvent (W–3) at 70° C. with agitation for 20 minutes. This solvent is a petroleum fraction sold by American Mineral Spirits Co. which boils at 158°–174° C. (90 percent between 158° and 170.5° C.) consisting of about 18 percent $C_8$ to $C_{11}$ aromatics, about 51 percent paraffins, about 24 percent $C_5$ and $C_6$ naphthenes and about 6 percent dinaphthenes.

In each instance, two layers formed which were separated while hot. Each was sampled and analyzed.

A. Extraction of Vanillin from Water Layer

A 100 ml. aliquot of the water layer of the vanillin mother liquors distillation residue containing 20.55 g. vanillin, 6.21 g. p-hydroxybenzaldehyde and 0.31 g. of 5-formylvanillin was extracted with 100 ml. of LEP(W–3) at 70°, the aqueous layer separated, each layer was analyzed and the procedure repeated using a second 100 ml. aliquot of the water layer and the same 100 ml. portion of LEP (W–3). This procedure was repeated again. The analytical data is shown in Table II. The distribution ratio for vanillin between water and solvent (vanillin in water/vanillin in solvent) was about 3; for p-hydroxybenzaldehyde, about 30; and for 5-formylvanillin, between 2 and 9. Their weight distribution in the two layers is shown in the following table.

TABLE II

Distribution of organics between water phase and solvent

| Extraction No. | | Water layer g/l | Solvent Layer g/l |
|---|---|---|---|
| 1 | Vanillin | 15.44 | 5.11 |
|  | p-hydroxybenzaldehyde | 6.15 | 0.06 |
|  | 5-formylvanillin | 0.22 | 0.09 |
| 2 | Vanillin | 19.0 | 5.87 |
|  | p-hydroxybenzaldehyde | 6.86 | 0.23 |
|  | 5-formylvanillin | 0.36 | 0.04 |
| 3 | Vanillin | 23.04 | 6.92 |
|  | p-hydroxybenzaldehyde | 7.08 | 0.23 |
|  | 5-formylvanillin | 0.43 | 0.18 |

As these data show, with the amount of solvent employed, the ratio of vanillin to by-products extracted by the solvent is substantially higher (ca. 34:1) than that retained in the water layer (ca. 2.1:1), thus showing a substantial increase in the purity of the vanillin which is extracted. It also shows that relatively little additional vanillin is extracted from successive portions of the water phase unless the solvent is cooled and the vanillin therein removed by crystallization.

B. Extraction of vanillin from oil layer

About 100 ml. (116 grams) of the oil layer and one liter of LEP (W-3) solvent were heated to 70° C., and stirred for 20 minutes. The two layers were then separated before cooling and each analyzed. The solvent layer was then cooled to 20° C., and the crystals which formed were filtered off. The filtrate was returned to the extraction flask and a second extraction of the oil layer was made in the same way. This cycle was repeated until a total of 13 extraction cycles were completed. The results of this experiment are summarized in the following table.

TABLE III

| Pass | Crystals Recovered Grams | % | p-hydroxy-benzaldehyde % | 5-formyl-vanillin % | aceto vanillone % |
|---|---|---|---|---|---|
| 1st | 8.4 | 96.8 | 2.4 | 0.0 |  |
| 2nd | 7.7 | 96.2 | 3.3 | 0.25 | 1.4 |
| 3rd | 7.3 | 94.8 | 3.4 | 0.9 | (avg 1-5) |
| 4th | 6.4 | 95.1 | 3.5 | 0.0 |  |
| 5th | 6.0 | 95.6 | 3.2 | 0.0 |  |
| 6th | 6.2 | 93.6 | 4.4 | 0.0 |  |
| 7th | 5.3 | 96.0 | 5.5 | 0.0 | 1.8 |
| 8th | 4.8 | 92.4 | 5.5 | 2.3 | (avg. 6-10) |
| 9th | 4.1 | 89.8 | 9.6 | 1.8 |  |
| 10th | 3.8 | 89.3 | 8.4 | 1.6 |  |
| 11 | 3.1 | 86.3 | 11.8 | 1.3 |  |
| 12th | 2.8 | 84.2 | 13.0 | 1.8 | 2.2 |
| 13th (last) | 1.8 | 78.2 | 16.7 | 3.9 | (avg 11-13) |
| Total | 67.6 | 93.2 Avg. | 5.4 Avg. | 0.7 Avg. |  |

At the end of these 13 cycles, a total of 63.1 grams (83 percent) of the 76.2 grams vanillin in the oil layer had been recovered in crystalline form. This vanillin is still contaminated with small amounts of p-hydroxybenzaldehyde and 5-formylvanillin but the product thus-obtained can be recrystallized from methanol-water mixtures by conventional procedures to obtain USP grade vanillin or, if desired, it can be recycled into vanillin process for purification along with vanillin produced by oxidation of lignin.

As these data show, the by-products build up very slowly in the solvent, so it can be recycled many times without stripping.

EXAMPLE 2

Continuous extraction

To the bottom of a long column maintained at 70° C., and filled about one-half to two thirds with the oil phase obtained by stripping the solvent from the methanol-water vanillin crystallization mother liquors, pump LEP Solvent (W-3) at a rate of about one-tenth the volume of the column per minute, thus permitting the solvent to flow through the oil phase. Pass the solvent over-flow through a cooling tower which cools the solvent to 20° C., and thence to crystallization tanks. Maintain the oil phase at a substantially constant level by the addition of more as it is extracted by the solvent. Remove solvent from the filter or centrifuge and then pass it through a heating tower which heats it to 70° C. and return it to the bottom of the extraction tower. For economy of operation, the heating and cooling towers can be combined into a heat exchanger coupled with a heater which provides the requisite heat to off-set heat losses in the system and provide the requisite temperature gradient between the shell and tube sides.

When the purity of the crystallized vanillin drops below the desired minimum or no further vanillin is extracted from the contents of the extraction tower, discharge the non-solvent phase from the extraction tower and replace it with additional crude vanillin. From time to time the solvent phase should be stripped of its solids by distillation or by passage through clean water in the extraction tower.

An alternative method within the scope of this invention of recovering vanillin from the oil layer is by dissolving the above-mentioned oil layer in sufficient water to form a solution and extracting with a hydrocarbon solvent in the same manner as in Example 1A or 1B.

We claim:

1. In a process for purification of vanillin contained in admixture with a lesser amount of at least one of p-hydroxybenzaldehyde, 5-formyl vanillin and acetovanillone, wherein major amounts of said vanillin are separated from said admixture by recrystallization from an aqueous methanol solution of said admixture to leave, after filtration to remove crystalline vanillin, a mother liquor substantially enriched in the non-vanillin components of said admixture and containing residual, unrecrystallized vanillin, the improvement comprising stripping methanol from said mother liquor and contacting the resulting aqueous pot residue at a temperature above 30° C. with an amount of a predominantly saturated petroleum hydrocarbon solvent maintained in a liquid state, said solvent having a boiling point essentially between 100° and 275° C., sufficient to extract some but not all of the vanillin from the mixture; separating the hydrocarbon solvent from the remainder of the starting mixture; cooling it below 30° C.; separating the crystalline vanillin which crystallizes therefrom; and repeating the aforesaid steps at least once using an amount of solvent insufficient to extract all the vanillin remaining in the mixture.

2. A process according to claim 1, wherein the mixture is contacted with the solvent at a temperature of about 70° C.

3. A process according to claim 2, wherein the solvent is cooled to about 20° C. prior to separating the crystals therefrom.

4. A process according to claim 1, wherein the solvent used to extract the initial portion of vanillin is reused, after crystallizing the vanillin therefrom, to extract additional vanillin remaining in the mixture.

5. A process according to claim 1, wherein the solvent is a petroleum fraction boiling between 125° and 200° C.

6. A process according to claim 5, wherein the mother liquor is that obtained in the purification by recrystallization from aqueous methanol of vanillin produced by the oxidation of lignin liquor; the methanol stripped pot residue is contacted with the hydrocarbon solvent at a temperature of about 70° C.; the solvent is cooled to about 20° C. prior to separating the initial portion of vanillin crystals therefrom; the solvent used to extract the initial portion of vanillin is reused, after crystallizing and removing the vanillin therefrom, to extract additional vanillin remaining in the mixture; and the solvent is a petroleum fraction boiling between 150° and 200° C.

* * * * *

UNITED STATES PATENT OFFICE
CERTIFICATE OF CORRECTION

Patent No. 3,686,322      Dated August 22, 1972

Inventor(s) Donald Guy Diddams

It is certified that error appears in the above-identified patent and that said Letters Patent are hereby corrected as shown below:

On the cover sheet [73] the assignee's name "Sterling Drug, Inc." should read -- American Can Company --.

Signed and sealed this 19th day of December 1972.

(SEAL)
Attest:

EDWARD M.FLETCHER,JR.            ROBERT GOTTSCHALK
Attesting Officer                    Commissioner of Patents